United States Patent [19]

Lange

[11] Patent Number: 4,644,520
[45] Date of Patent: Feb. 17, 1987

[54] PROTECTED OPTICAL DISK OF WELDED CONSTRUCTION

[75] Inventor: Francois Lange, Antony, France

[73] Assignee: Alcatel Thomson Gigadisc, SA, Paris, France

[21] Appl. No.: 753,536

[22] Filed: Jul. 10, 1985

[30] Foreign Application Priority Data

Jul. 10, 1984 [FR] France ................... 84 10941

[51] Int. Cl.$^4$ ............ H04N 5/76; G01D 15/34; G11B 7/26
[52] U.S. Cl. ................... 369/284; 369/286
[58] Field of Search .......... 369/280, 281, 282, 283, 369/284, 286; 346/135.1; 156/73.1

[56] References Cited

U.S. PATENT DOCUMENTS

| | | | |
|---|---|---|---|
| 4,164,068 | 8/1979 | Shropshire | 156/73.1 |
| 4,443,870 | 4/1984 | Hazel et al. | 369/44 |
| 4,539,673 | 9/1985 | Winslow | 369/284 |
| 4,564,932 | 1/1986 | Langé | 369/284 |

FOREIGN PATENT DOCUMENTS 2525795 11/1983 France.
2116667 9/1983 United Kingdom.

OTHER PUBLICATIONS

Dreger, *Welding Plastics by Vibration*, Machine Design, vol. 46, No. 31, Dec. 26, 1974, pp. 42–44.
Mengason, *Vibration Welding-Shaking Up the Status Quo in Joining Plastics*, vol. 36, No. 8, Aug. 1980, pp. 20–23, Plastics Engineering.

*Primary Examiner*—Steven L. Stephan
*Attorney, Agent, or Firm*—Cushman, Darby & Cushman

[57] ABSTRACT

A protected optical disk of welded construction comprises a housing the diameter of which is its largest dimension. The housing consists of parts fabricated from a thermoplastic material joined together by at least one circular weld which occupies part of a plane annular joining area perpendicular to the axis of rotation of the disk. An internal chamber is bordered radially by this joining area. An information carrying layer is contained in this chamber. A pair of grooves lies one on either side of the portion of each of the parts included in the weld and there is a circularly disposed sharp edged projection between the grooves of each pair. In this way the grooves and the projection form a weld preform on at least one joining surface of the parts.

10 Claims, 16 Drawing Figures

PROTECTED OPTICAL DISK OF WELDED CONSTRUCTION

BACKGROUND OF THE INVENTION

1. Field of the Invention

The present invention relates to protected optical disks which contain inside a housing made in several parts at least one layer for storing data written and read optically.

2. Description of the Prior Art

For the data storage layer use may be made of heat-deformable structures producing markings in relief by surface marking using finely focussed laser light. The relief markings may consist in an alteration by ablation or in a rounded protuberance. Equally envisagable is a marking without relief in light-sensitive layers based on silver-containing or diazotype materials. It is also envisagable to use magnetic or metallic layers in which the marking consists in a phase change following thermo-optical writing.

All these layers share considerable vulnerability to external agents and require appropriate protection achieved by enclosing them in a rigid housing through which light can pass.

In the case of optical disks, the protective housing generally acts as a support for the thin layer which it has to protect. As the housing has a radial dimension which is significantly greater than its other dimensions, the parts from which it is made up must be assembled in such a way as to avoid any loss of flatness of the carrier layer. In order to write or read data the sensitive layer must be scanned with an extremely small light spot which is obtained in the immediate vicinity of the focus of a light beam subtending a large angle. To achieve the optical exposure of a substantially plane layer, the optical disk is centered on a shaft rotated about an axis perpendicular to the layer and the write or read beam is moved radially, in order to trace out a track. Proper track following entails the point of convergence of the radiation being coincident with the surface of the layer, whence the necessity for a focussing control system. Defects in respect of the flatness of the sensitive layer must be taken into account by the focussing control system and are more often than not directly associated with distortion of the housing constituting the optical disk since the layer tends to adopt the shape of its protective casing. When an optical disk housing is made by assembling two superposed circular flanges, with a circular weld joining them, the overall structure is subject to residual mechanical stresses due to shrinkage of the material melted during welding. These stresses may compromise the flatness of the flange carrying the sensitive layer to the point that warping of the optical disk and/or buckling of its structure make it impossible to achieve focussing because of undulations affecting the circular perimeter during scanning. In theory, the binding effect of a weld on a structure with a symmetry of revolution should result in purely radial curvature of the layer support such that each circular track element remains situated in a plane orthogonal to the rotation axis. Moderate curvature of this kind, producing a bell shape, may be taken into account by the focussing control system.

In practice, this circumferential flatness leaves something to be desired even if care is taken to use parts having all the required elastic and geometrical characteristics, since the bell-shaped deformation may be of greater amplitude than catered for by the reading system.

In U.S. Pat. No. 4,564,932 there is described a method of manufacturing a protected optical disk which consists in welding together the thermoplastic material parts constituting the housing. The heat necessary for welding is applied in the form of ultrasonic vibration causing melting of the thermoplastic material in a number of concentric annular areas of restricted width in the radial direction, in order to obtain a joint comprising multiple welds. The improvement in terms of the flatness qualities of a disk obtained by this method arises from the fact that a multiple weld joint can offer the same resistance to separation of the parts as a single weld joint but with reduced circumferential forces by virtue of the fact that these forces are proportional to the cross-section of the molten material. Thus a double weld joint involves a quantity of molten material half that employed to form a single weld twice as wide and twice as deep. Ultrasonic welding entails a preparatory stage which consists in providing on one of the surfaces to be joined a sharp-edged projection which serves to concentrate on a circular line the thermal focus which gives rise to the weld. The flatenning of this projection during welding is a parameter which is difficult to control, which explains a lack of circumferential regularity of the weld, even if its location is better defined radially than in the absence of a projection of this kind. Furthermore, the excess material constituting the projection is squeezed by the flat surfaces on either side of it, leaving a narrow interstice which promotes the concentration of mechanical stresses. It is thus seen that the preparation of the surfaces to be joined by the preliminary formation of circumferential projections means that the final shape of the weld and the residual stresses which it produces are not totally controlled.

With a view to alleviating this disadvantage, the invention proposes that the surfaces to be joined should be preformed with a recessed profile contributing to improved delimitation of the weld and to reducing its circumferential stiffness by virtue of radial separation which renders shrinkage phenomena less crucial with regard to the optical disk. This more suitable shape is obtained by preforming the surfaces to the joined with two circular grooves one on either sie of the sharp-edged projection which produces the weld on local melting by ultrasonic means.

SUMMARY OF THE INVENTION

The invention consists in a protected optical disk of welded construction comprising a housing the diameter of which is its largest dimension and which consists of parts fabricated from a thermoplastic material joined together by at least one circular weld which occupies part of a plane annular joining area perpendicular to the axis of rotation of the disk, an internal chamber bordered radially by said joining area, an information carrying layer in said chamber, a pair of grooves one on each side of the portion of each of said parts to be included in said weld, and at least one circularly disposed sharp edged projection between said grooves of at least one pair, whereby said grooves and said at least one projection constitute a weld preform on at least one joining surface of said parts.

Other objects and advantages will appear from the following description of examples of the invention, when considered in connection with the accompanying drawings, and the novel features will be particularly pointed out in the appended claims.

DESCRIPTION OF THE PREFERRED EMBODIMENTS

The following description is concerned with optical disk housings formed of thermoplastic parts welded together. The manufacture of optical disks is particularly illustrative of the scope of the invention, as defects in respect of flatness acceptable in this type of application are such that special attention must be given to the effects of residual stresses in the welds.

Figure 1:
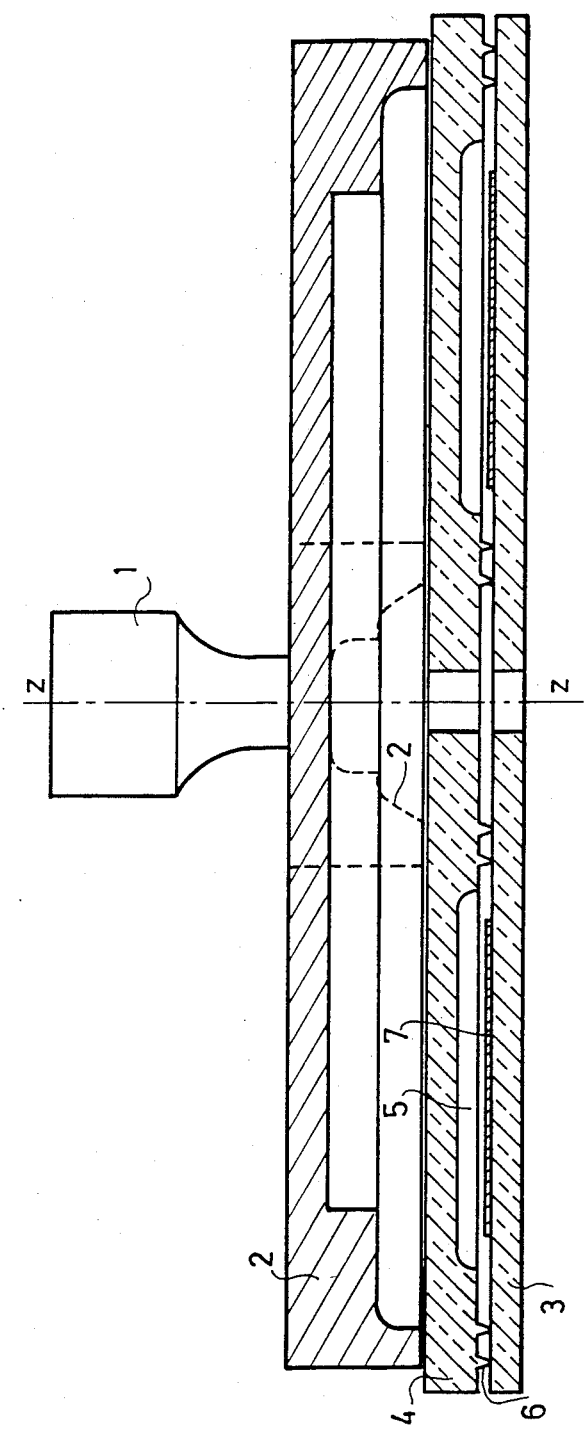
FIG. 1 illustrates the method of welding together the parts of an optical disk housing.
Figure 1:
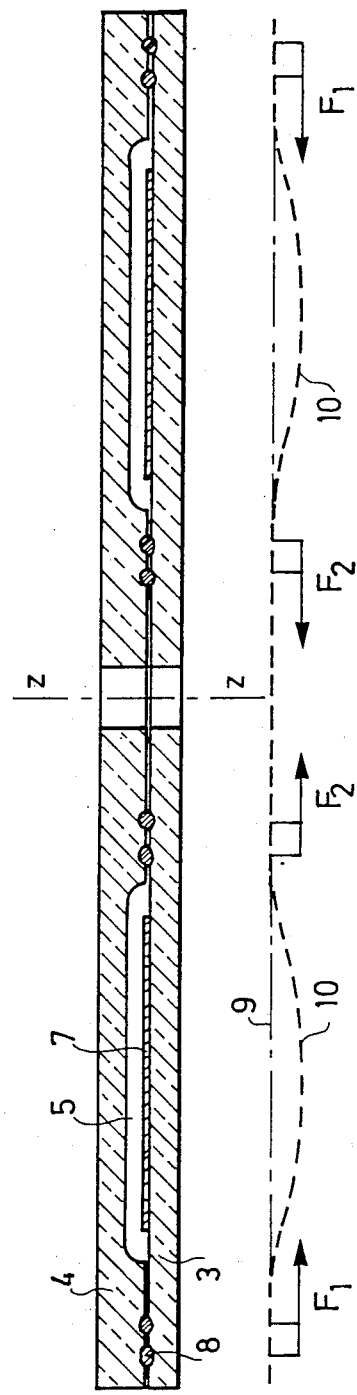

In the upper part of FIG. 1 there is shown by means of a diametral cross-section the method for welding together the two parts of a housing which constitues a protected optical disk. This disk housing is in the form of a thermoplastic material enclosure delimiting an internal chamber 5 which contains a layer 7 designed to store optically written data. Optical reading may be effected without it being essential to provide for a chemical developing process. Thus the housing may be sealed after depositing a layer 7 devoid of any information provided that one of the flanges 3 and 4 which constitute it allows light to pass through it for writing and reading purposes. Housings of this kind may comprise more than two parts; for example, it might be envisaged to stack three plates separated by spacers to form a housing with two superposed chambers each containing a sensitive layer.

Whatever the structure adopted, the problem that arises is to keep the sensitive layer as flat as possible after welding together the at least two circular parts of a housing. The welding together of thermoplastic materials is significantly more advantageous that using an adhesive. Also, the ultrasonic welding technique guarantees efficiency and precise location of the welds.

Thus in the upper part of FIG. 1 there is shown above the flange 4 an ultrasonic welding system which comprises a generator 1 which vibrates an annular part 2. This annular part channels ultrasonic vibration produced by the generator 1 and causes it to enter the material of the flange 4 with which it is in contact. By virtue of its placticity, the thermoplastic material subject to such high-frequency vibration is heated to form a weld. To enable the ultrasonic vibration to be transmitted to the lower flange 3, a preform 6 is created on the surface of the flange 4 which must be joined to the surface of the flange 3 on which the sensitive layer 7 is deposited. This preform consists of one or more circularly disposed contiguous projections. Reference can with benefit be had to the aforementioned French patent application, which gives a detailed description of this type of preform. The upper part of FIG. 1 shows the stacked parts immediately before ultrasound is applied, the middle part of FIG. 1 showing the optical disk housing after welding. It is seen that the flanges 3 and 4 have moved closer together by virtue of a compression in the direction parallel to the axis Z which is the rotation axis of the disk. This movement together is made possible by the melting of the preform 6 serving as means for localizing the welds 8.

The molten material on cooling in a rigid environment is subject to shrinkage accompanied by the development of residual mechanical stresses. These stresses subject the welds 8 to expansion forces which are balanced by contraction forces exerted in the immediate vicinity of the periphery of the welds 8. There results from the shrinkage phenomena ocurring at the welds 8 a binding stress which tends to compress the flanges 3 and 4 radially. Each weld thus behaves as a tight belt which can have a diameter of as much as 30 cm. In the lower part of FIG. 1 the chain-dotted straight line 9 indicates the diametral cross-section of the surface of the layer 7 before execution of the weld and the dashed line 10 shows the diametral cross-section after welding. The latter is curved because of the forces F1 and F2 due to shrinkage of the material of the welds 8.

Although the separation between the lines 9 and 10 is considerably exaggerated in FIG. 1, it is nevertheless sufficient in practice to render the disk unusable, since the focussing control system cannot compensate for the resulting writing or tracking beam focussing errors. The least acceptable defect is the warping of the disk characterized by a line 10 which changes shape according to the diametral cross-section selected. Warping of the disk may result from a lack of uniformity in the circumferential distribution of the residual stresses, but it may also arise from instability due to buckling of an elastic plate subject to radial compression.

Figure 2:
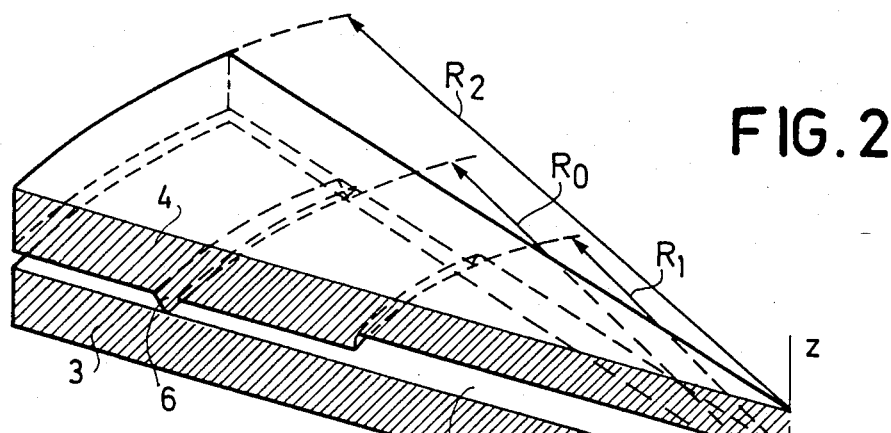
FIGS. 2 through 4 are isometric views of sectors of an optical disk housing of the prior art.
Figure 3:
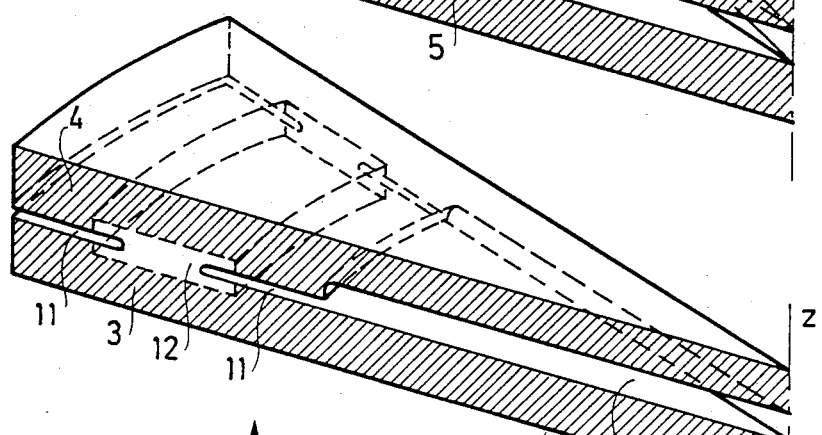

In order to better explain the invention there is shown in FIG. 2 a sector of a housing having an annular chamber 5 which extends radially away from the rotation axis Z to a distance R1. The welding together of the flanges 3 and 4 takes place in an annular area which extends between radii R1 and R2; this area is defined by a lip on the flange 4. To provide for good transmission of ultrasonic vibration between the flanges 3 and 4, there is provided at a distance R0 from the axis Z a circular configuration preform the profile of which is a sharp point. This known arrangement produces a weld 12 as shown in FIG. 3 by a molten area the cross-section of which is not shaded. The movement towards one another of the flanges 3 and 4 during welding and the melting of the preform 6 has left two interstices 11 at the bottom of which high stress concentrations are produced. The height of the weld and that of the interstices are extremely exaggerated in FIG. 3. The spreading of the molten material between the flanges 3 and 4 is difficult to control with any precision, but it is clear that the flanges 3 and 4 cannot come into contact.

Figure 4:
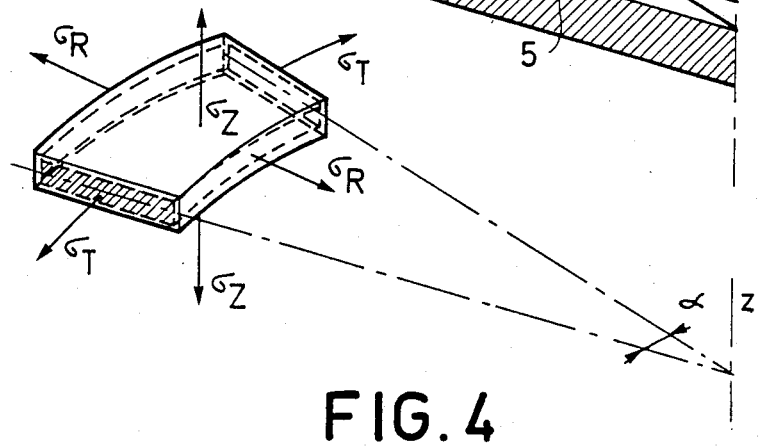

To explain the mechanism whereby residual stresses occur through shrinkage, there is shown in FIG. 4 a sector of the weld 12 subtending an angle α. The volume shown in full line delimits the boundary which separates the molten material from the rigid surroundings at the time when it begins to solidify. The volume shown in dashed line, the cross-section 13 of which is shaded, represents the completely cool core on the assumption that it is free to contract within the surrounding volume shown in full line. Knowing that a thermoplastic material, such as polymethylmethacrylate, has a coefficient of thermal expansion of the order of 7 to $9 \times 10^{-5}/°C$. and that the temperature at which its elastic strength is restored is between 90° C. and 130° C., the linear shrinkage $e_{th}$ between these two volumes may be estimated at $10^{-3}$ on returning to ambient temperature. The contraction of the weld cannot be considered in isolation, of course, and it is necessary to consider the material constituting it as subject to a stress state equivalent to simple tension in three dimensions. In the known manner, there are shown in FIG. 4 the tension forces normal to the faces of the elementary volume 13 which arise because of shrinkage and because of the extension effect of the rigid material surrounding the weld. The radial tension is designated $\sigma_R$, the tension $\sigma_Z$ is parallel to the axis Z and the tension $\sigma_T$ is the circumferential binding tension. The material surrounding the weld is naturally not infinitely rigid and, for the tensions $\sigma_R$, $\sigma_Z$ and $\sigma_T$ to appear, it is also deformed. The diagram in FIG. 4 is incomplete since it ignores tangential stresses, but it does give a good idea of the residual stress phenomena. The tension $\sigma_Z$ is low, since the interstices 11 mean that the flanges 3 and 4 do not resist shrinkage in the direction of the axis Z. On the other hand, the tensions $\sigma_R$ and $\sigma_T$ explain the binding force on the flanges 3 and 4 resulting from shrinkage of the weld 12. It is beneficial to set out here the equations for simple tensile stresses in three directions on an elastic body:

$$e_R = 1/E[\sigma_R - \nu(\sigma_T + \sigma_Z)]$$

$$e_T = 1/E[\sigma_T - \nu(\sigma_R + \sigma_Z)]$$

$$e_Z = 1/E[\sigma_Z - \nu(\sigma_R + \sigma_T)]$$

in which E is Young's modulus and $\nu$ is Poisson's coefficient for the elastic material subject to such tension. The first members of these equations are proportional elongations $e_R$, $e_T$ and $e_Z$ in the radial, circumferential and thickness (Z) directions, respectively.

Given the high rigidity of the material surrounding the weld, it may be assumed that the elongations $e_T$ and $e_R$ compensate for the linear shrinkage $e_{th}$ which, given the foregoing hypotheses, yields the following simplified equations:

$$e_{th} = 1/E(\sigma_R - \nu\sigma_T)$$

$$e_{th} = 1/E(\sigma_T - \nu\sigma_R)$$

$$e_Z = -\nu/E(\sigma_R + \nu\sigma_T)$$

Knowing that the value of $\nu$ is necessarily 0.5 at the most, it is seen that the tensions $\sigma_R$ and $\sigma_T$ are equal to $E \cdot e_{th}/(1-\nu)$.

If the weld 12 were subject only to simple tension in the circumferential direction, the resulting tensions would be $\sigma_Z = 0$, $\sigma_R = 0$ and $\sigma_T = E \cdot e_{th}$.

Figure 10:
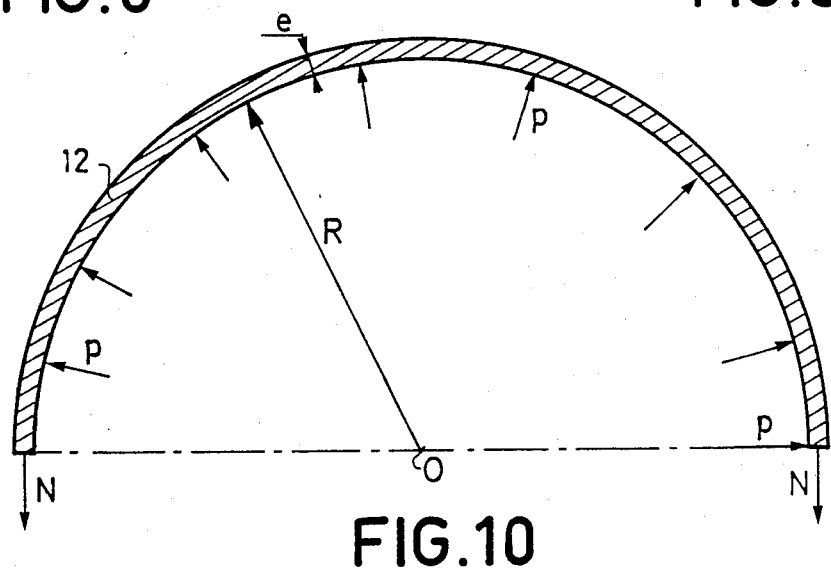
FIG. 10 is an explanatory diagram.

The effect of binding by the weld 12 is essentially represented by the tension $\sigma_T$. Referring to FIG. 10, it is seen that mechanical equilibrium or a half-weld 12 of radius R seen in the plane of the optical disk is given by a force N at each end which corresponds to the circumferential tension $\sigma_T = N/e \cdot h$ where e is the radial thickness of the weld and h its height in the Z direction. These forces are balanced by the action of a radial pressure p acting on the inside of the weld due to the reaction of the flanges 3 and 4 and to the deformation to which they are subject.

Investigating these equilibrium conditions yields the equation: $N = p \cdot r \cdot h$ from which it is a simple matter to derive: $p = e \cdot \sigma_T/R$.

The deformation of the flanges 3 and 4 is less the smaller p, which is achieved by reducing e and/or $\sigma_T$.

In practice, with a value for Poisson's coefficient of the order ot 0.3, eliminating the tensions $\sigma_R$ makes it possible to reduce the tension $\sigma_T$ by 30%. Maintaining e at a constant and if possible low value also has a favorable effect on the warping phenomena to be eliminated.

Figure 5:
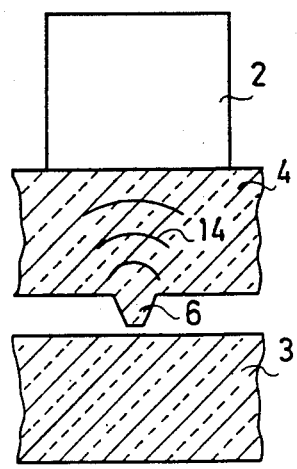
FIGS. 5 through 7 are explanatory diagrams.
Figure 6:
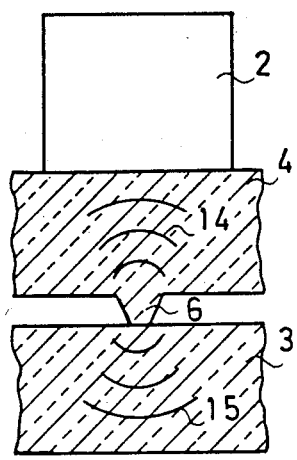
Figure 7:
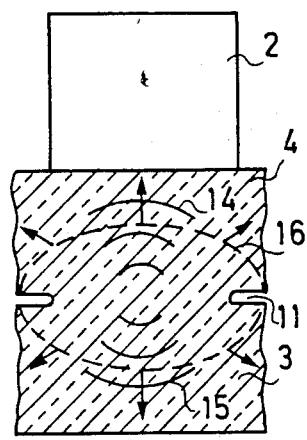

The trend which emerges from the foregoing interpretation is all the clearer when the situation shown in FIGS. 5 through 7 is considered, these figures corresponding to ultrasonic welding as in the prior art.

Figure 8:
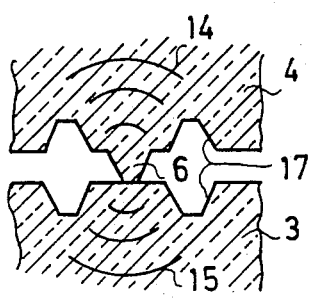
FIGS. 8 and 9 show the profile of preforms in accordance with the invention and the resulting weld structure.
Figure 9:
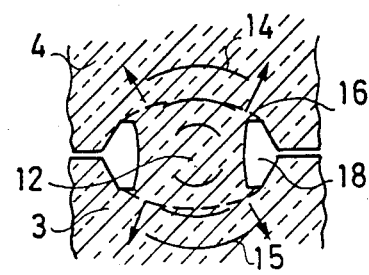
Figure 11:
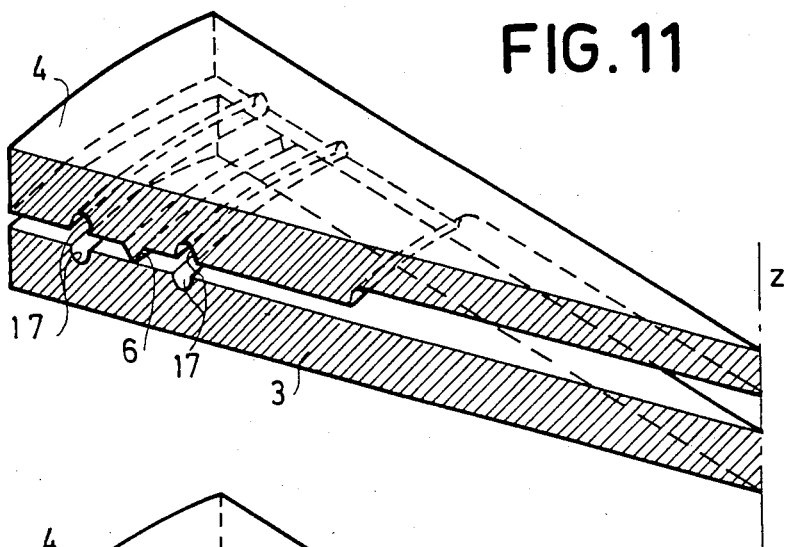
FIGS. 11 through 13 are isometric views of sectors of an optical disk housing in accordance with the invention.
Figure 12:
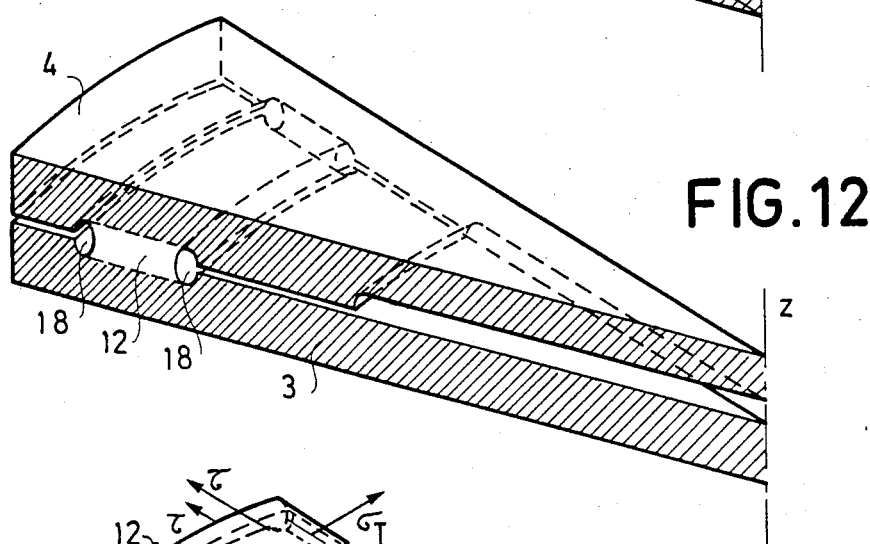
Figure 13:
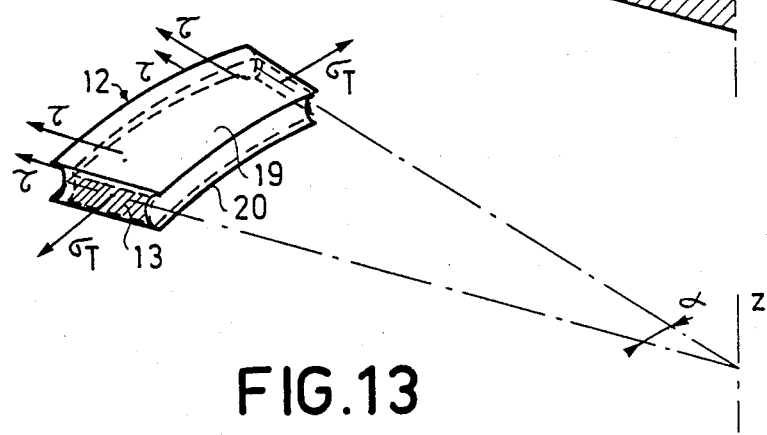

FIG. 5 shows the flanges 3 and 4 of a housing with a preform 6 which consists of a projection of the lower surface of the flange 4. The ultrasonic welding tool 12 is applied against the outside surface of the flange 4 and generates ultrasonic vibration the wavefronts 14 of which converge towards the projection 6. FIG. 6 shows that when the point of the projection 6 comes into contact with the inside surface of the flange 3, the vibration can spread out into the flange 3 with divergent wavefronts 15. The ultrasonic heating effect is maximal in the vicinity of the focus, that is to say the location of the projection 6 and its point of contact with the flange 3. FIG. 7 shows the weld obtained within an enveloping contour 16 the elliptical shape of which is more realistic than that previously shown. The arrows away from the center represent the heat flux as a result of which the molten central core solidifies. Note in FIG. 7 that the projection 6 is completely absorbed into the weld area and that the interstices 11 which existed in FIG. 6 on each side of the projection 6 have decreased in height and lengthened, corresponding to a widening in the radial direction which is difficult to control acurately. The extent of the weld is partly controlled by the presence of the projection 6, by focussing the vibrations, and through their time of application. FIG. 8 shows the modified preform which is the object of the present invention. This is an embodiment in which the difference relative to FIG. 6 consists in bracketing the projection 6 by a pair of grooves 17 in the inside surface of the flange 4 and by another pair of grooves 17 in the inside surface of the flange 3. The preform in the flange 4 has a combined recessed and projecting profile of circular configuration; that in the flange 3 is of recessed profile only, with the same circular configuration. In FIG. 9, which shows the final stage of welding, it is seen that the grooves 17 have fulfilled a composite delimiter role. As can be seen in FIG. 8, the grooves 17 have a delimiting action with regard to the extend of the vibration 14-15 which serves to heat the thermoplastic material. To this action there is added radial thermal insulation of the heat flux which tends to reach the vicinity of the weld area. It is seen in FIG. 9 that this delimiting action continues on formation of the weld since voids 18 remain at the radial location of the grooves 17. As the heat flux cannot be evacuated laterally, the weld 12 forms a bridge between the flanges 3 and 4. The movement together of the flanges 3 and 4 may continue until there is clear contact between the joining inside surfaces, since the excess material contained in the projection 6 is easily accommodated without marked speading of the weld and without forming any interstices. FIGS. 11 through 13 illustrate in three dimensions a sector of an optical disk housing fabricated and welded together in accordance with the invention. The improved characteristics of the preform are readily appreciated on comparing FIGS. 11 through 13 with the like FIGS. 2 through 4. In all these figures the same references designate the same elements as in the preceding figures. With reference to FIG. 13, there is shown a sector subtending an angle α of the weld 12 in accordance with the invention. It is seen that the normal tensions $\sigma_R$ are no longer present by virtue of the existence of the voids 18. On shrinking, the weld tends to move towards the axis Z, but is prevented from doing so by tangential tension $\tau$ exerted on the surfaces perpendicular to the Z axis. Equilibrium of the weld entails its deformation in shear, but the circumferental tension $\sigma_T$ is reduced since the weld is able to deform more, given that it is not radially linked to the surrounding material of the flanges 3 and 4.

Figure 14:
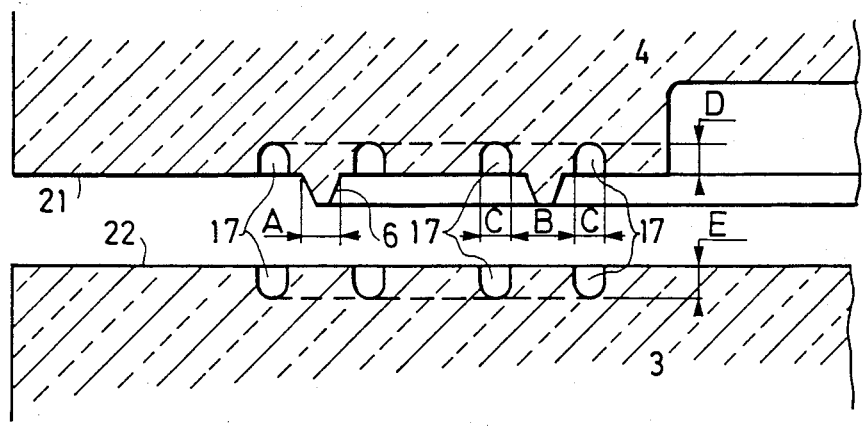
FIGS. 14 through 16 are partial views in cross-section of alternative preforms in accordance with the invention.

FIG. 14 is a partial view in cross-section of a pair of preforms enabling two flanges 3 and 4 to be joined together by two concentric welds. The preform on the joining surface 21 of the flange 4 comprising two projections 6 with a width A at the base equal to 0.3 mm, for example. Each projection 6 has a height of the same order of magnitude as its width A and is flanked by two grooves 17 of depth D equal to 0.3 mm, for example. Each groove 17 has a width C not exceeding 0.3 mm in the example chosen and the area between the two grooves 17 has a width B of the order of 0.5 mm. The preform on the joining surface 22 of the flange 3 has the same dimensions, but no projection 6. Thus the projection 6 is provided on one only of the joining surface 21 and 22, simplifying their juxtaposition. There is naturally nothing to oppose providing one projection 6 on the surface 21 and the other projection 6 on the surface 22 since they are situated at different radii of the disk. The depth D of the grooves provided on surface 22 is preferably equal to D, but a reduction in the residual stresses would even be achieved by retaining a completely smooth surface 22, simplifying fabrication of the flange 3.

With the arrangement of the preform in FIG. 14, the surfaces 21 and 22 may come into firm contact since the excess material which the projections 22 constitute may be accommodated by the grooves 17. When the flanges 3 and 4 are subject to a torque tending to turn the surfaces 21 and 22 relative to one another, the bearing area being much larger, there are well distributed retaining forces available, but on shrinkage of the welds a tension $\sigma_Z$ develops since contraction of the molten material is opposed by the firm contact between the surfaces 21 and 22. When the resistance to tearing apart of the welded flanges may be completely assured by the welds, an interstice may be left between the surfaces 21 and 22, for example by metering the force compressing the flanges during the welding operation. However, for easier control of such incomplete movement towards one another, the preform may be modified as shown in FIGS. 15 and 16.

Figure 15:
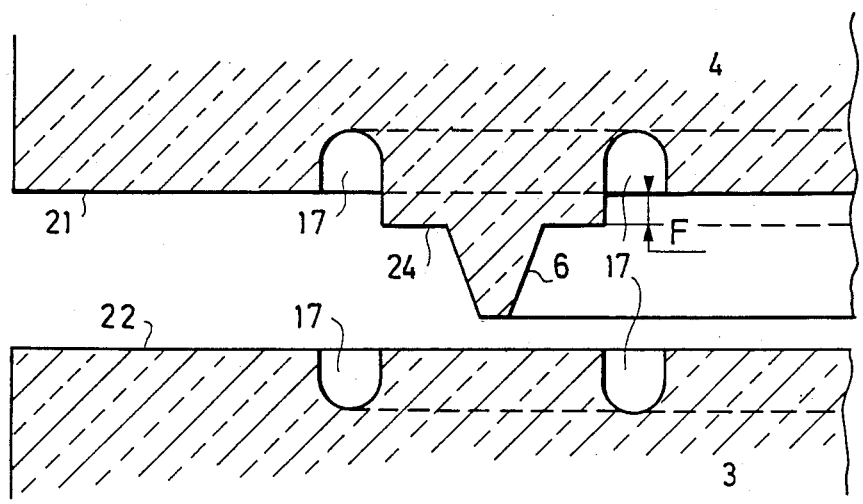

In FIG. 15 it is seen that a shoulder 24 of height F is provided between the grooves and projection 6. The height F is between 0.1 and 0.3 mm to achieve the required spacing. The extent B of the shoulder, that is to say the radial distance of its projection below the plane of the surface 21, is between 1.3 and 3 times the width of the base of the projection 6. This represents a compromise, since if too small it would not prevent the surfaces becoming contiguous when it melts with the projection 6 and if too large it would prevent the melting action reaching a substantial proportion of the mass between the grooves 17. As shown in FIG. 15, the preform on the surface 22 of the flange 3 is unchanged relative to the disposition of FIG. 14.

Figure 16:
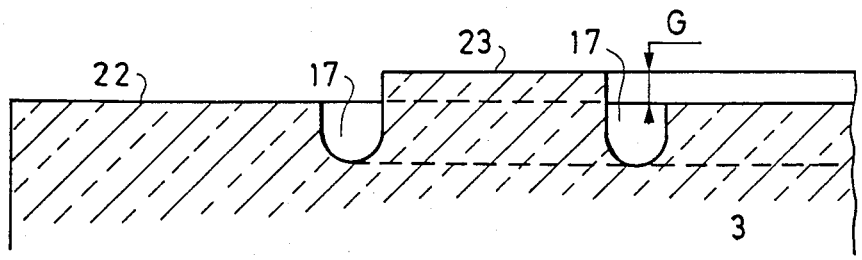

FIG. 16 shows that the shoulder provided to oppose firm contact between the surfaces 21 and 22 may also be provided on the surface 22 in the form of a projection 23 of height G. This projection 23 may substitute for that provided on the surface 21 shown in FIG. 15, but may equally well complement the latter.

In the foregoing there is described a method of welding thermoplastic parts which consists in delimiting the welds by recesses the depth of which is between 0.1 and 0.4 mm and the distance between which is such that the greater part of the material between them is actually melted. This separation is typically between 0.3 and 0.6 mm and the width of each recess is comparable to its depth. The diametral cross-section of the weld may be between 0.05 and 0.50 mm$^2$. The subdivision of a single weld into a number of concentric welds may advantageously be combined with the arrangements described hereinabove.

It will be understood that various changes in the details, materials and arrangements of parts which have been herein described and illustrated in order to explain the nature of the invention may be made by those skilled in the art within the principle and scope of the invention as expressed in the appended claims.

I claim:

1. A protected optical disk of welded construction comprising:
   a housing the diameter of which is its largest dimension and which consists of at least first and second thermoplastic parts, said parts being joined together to form said housing by at least one circular weld in a planar annular joining area perpendicular to the axis of rotation of the disk, said housing defining a chamber bordered radially by said joining area;
   an information carrying layer in said chamber;
   at least a pair of grooves being provided on each of said parts that are welded to form said housing, the grooves of each said pair being defined on opposite sides of the portion of its respective part which is included in said weld; and
   at least one circularly disposed sharp edged projection between said grooves of at least one pair,
   whereby said grooves and said at least one projection constitute a weld preform on at least one joining surface of said parts and when said parts are welded to form said housing the grooves of each said pair are disposed on opposite sides of a respective circular weld.

2. Disk according to claim 1, wherein one preform comprising at least one projection is welded to a facing preform comprising a pair of grooves between which is a flat area adapted to provide a seating for said at least one projection.

3. Disk according to claim 2, wherein said flat area is formed on a projection between its respective grooves in said planar annular joining area.

4. Disk according to claim 1, wherein said projection is carried by a shoulder situated between said grooves and projecting relative to said planar annular joining area.

5. Disk according to claim 1, when at least one weld borders said internal chamber externally or internally and at least one of said parts is a flange comprising a recessed part forming the interior part of said chamber.

6. Disk according to claim 1, wherein the depth of said grooves is between 0.1 and 0.4 mm.

7. Disk according to claim 1, wherein the distance between said grooves of the same pair is between 0.3 and 0.6 mm.

8. Disk according to claim 7, wherein said distance is between 1.3 and 3 times the width of said projection at the base.

9. Disk according to claim 3, wherein the height of said projection is between 0.1 and 0.3 mm.

10. Disk according to claim 1, wherein said thermoplastic material is polymethylmethacrylate.

* * * * *